United States Patent
McMahan et al.

(10) Patent No.: US 7,406,322 B2
(45) Date of Patent: Jul. 29, 2008

(54) DETERMINING APPROXIMATE LOCATIONS OF NETWORK DEVICES THAT ARE INACCESSIBLE TO GPS SIGNALS

(75) Inventors: Paul Franklin McMahan, Apex, NC (US); Robert Thomas Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 10/908,032

(22) Filed: Apr. 26, 2005

(65) Prior Publication Data

US 2006/0240848 A1      Oct. 26, 2006

(51) Int. Cl.
*H04Q 7/20* (2006.01)

(52) U.S. Cl. ............... 455/456.6; 455/456.1; 455/404.2; 455/440; 455/414.2

(58) Field of Classification Search ............... 455/456.1, 455/10, 456.6, 404.2, 440, 414.2
See application file for complete search history.

(56) References Cited

U.S. PATENT DOCUMENTS

| | | | | |
|---|---|---|---|---|
| 6,473,038 | B2 | 10/2002 | Patwari et al. | 342/450 |
| 6,643,586 | B2 | 11/2003 | Allen et al. | 701/213 |
| 6,819,267 | B1 | 11/2004 | Edmark et al. | 340/988 |
| 6,831,598 | B2 | 12/2004 | Saint-Hilaire et al. | 342/357.09 |
| 7,202,814 | B2 * | 4/2007 | Caspi et al. | 342/357.07 |
| 2003/0065443 | A1 | 4/2003 | Saint-Hilaire et al. | 701/213 |
| 2003/0134645 | A1 * | 7/2003 | Stern et al. | 455/456 |
| 2003/0216143 | A1 | 11/2003 | Roese et al. | 455/456.1 |
| 2003/0225893 | A1 | 12/2003 | Roese et al. | 709/227 |
| 2004/0053625 | A1 * | 3/2004 | Bye | 455/456.1 |
| 2004/0093325 | A1 | 5/2004 | Banerjee et al. | 707/3 |
| 2004/0198217 | A1 * | 10/2004 | Lee et al. | 455/3.01 |
| 2004/0203380 | A1 | 10/2004 | Hamdi et al. | 455/41.2 |
| 2004/0258013 | A1 | 12/2004 | Belcea | 370/328 |
| 2004/0259571 | A1 | 12/2004 | Joshi | 455/456.1 |
| 2005/0068227 | A1 | 3/2005 | Caspi et al. | 342/357.1 |
| 2005/0079877 | A1 * | 4/2005 | Ichimura | 455/456.1 |

FOREIGN PATENT DOCUMENTS

| | | |
|---|---|---|
| CN | 1574846 A | 2/2005 |
| EP | 1491858 A1 | 12/2004 |
| WO | WO03107595 A1 | 12/2003 |

OTHER PUBLICATIONS

Brown, J., "Location-Based Control of Wireless Communications Device Features" IBM Patent Application, U.S. Appl. No. 10/845,564, filed May 13, 2004.

* cited by examiner

*Primary Examiner*—Duc Nguyen
*Assistant Examiner*—Wayne Cai
(74) *Attorney, Agent, or Firm*—David Irvin; Winstead, P.C.

(57) ABSTRACT

Methods, apparatus, and computer program products for determining approximate locations of network devices. Information is received concerning last known locations of portable network devices that attach to a network, and used to compute an approximate location of an obscured network device attached to the network. In some embodiments, the last known locations of the portable network devices may be determined using information from GPS satellites. The approximate location of the obscured network device may be used as the approximate location of other stationary network devices connected to the same network.

4 Claims, 3 Drawing Sheets

DETERMINING APPROXIMATE LOCATIONS OF NETWORK DEVICES THAT ARE INACCESSIBLE TO GPS SIGNALS

BACKGROUND

The invention concerns the field of network management, and more particularly concerns determining the locations of network devices that are unable to access satellite positioning systems such as GPS because of shielding by buildings.

Internetworks and intranetworks have become exceedingly complex, and therefore hard to manage. Thus, in order to enable a network operator to manage such networks effectively, advanced network management systems provide the operator with a simplified graphical visualization of the network. Traditionally, this is done using layout algorithms that place the network devices in circles, in trees, and the like.

Technology has existed for some time to lay out network devices in such a visual display using the latitudes and longitudes of the devices. However, in practice this has not been useful, because there has been no effective way to gather the needed coordinates.

Although in principle a network device could be equipped with Global Positioning Satellite (GPS) capability to determine its location, GPS has a low RF link margin, and therefore cannot be used reliably to determine locations of network devices that are used indoors. Unfortunately, many network devices of practical interest are indeed used indoors routinely. These include, for example, network devices inside offices and laboratories, local area network (LAN) closets, data centers, and so forth.

Of course, the needed coordinates could be manually determined and manually entered into a network management database. Such a process, however, is not only impractical in large scale networks, it is also time consuming, error prone, and subject to constant revision as the locations of network devices change.

Thus, there is a need for a way to automatically determine and track the locations of network devices that are used in environments which are inaccessible to GPS signals, for the benefit of network management systems.

SUMMARY

Aspects of the invention include methods, apparatus, and computer program products for determining approximate locations of network devices. Information is received concerning the last known locations of portable network devices that attach to a network, and used to compute an approximate location of an obscured network device attached to the network. In some embodiments, the last known locations of the portable network devices may be determined using information from GPS satellites. The approximate location of the obscured network device may be used as the approximate location of other stationary network devices connected to the same network.

DETAILED DESCRIPTION

Figure 1:
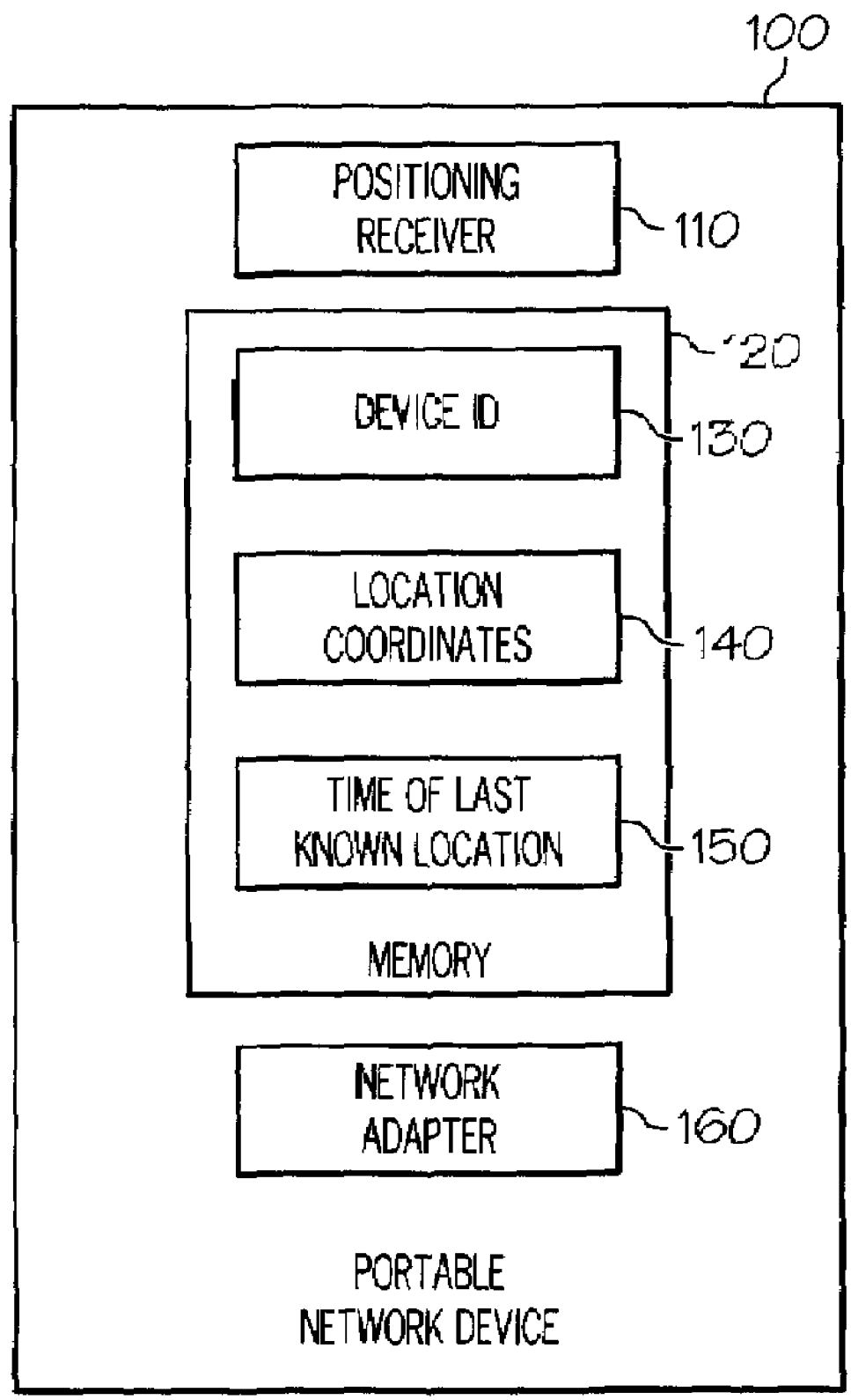
FIG. 1 is a block diagram that shows aspects of a portable network device.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, apparatus, data processing system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be utilized, including hard disks, CD-ROMs, optical storage devices, and magnetic storage devices.

Computer program code for carrying out operations of the present invention may be written in an object oriented programming language such as Java7, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to a flowchart illustration and block diagrams of methods, apparatus (systems), and computer program products according to embodiments of the invention. It will be understood that blocks of the flowchart illustration and block diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and block diagram blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and block diagram blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and block diagram blocks.

FIG. 1 is a block diagram that shows aspects of a portable network device 100. The portable network device 100 may be, for example, a laptop computer, a cellular telephone or other communicator, a personal digital assistant, and the like. The portable network device is equipped with a positioning receiver 110. In a preferred embodiment, the positioning receiver 110 is a GPS receiver.

Because communication satellites are constrained by the availability of electrical power, the RF signals that they emit are typically weak. Thus, a satellite system such as GPS has a low link margin. Link margin indicates the RF power budget that is available beyond the level of power needed to provide a given minimal quality of communication over an unobstructed path in free space. The link margin is then proportional to the greatest additional loss that may be inserted in a particular working communication path by an obstruction such as, for example, a building. Because the link margin of GPS is unavoidably low, due to satellite power constraints, the capability of GPS signals to penetrate buildings is quite limited. Moreover, a GPS receiver typically needs visibility of at least three GPS satellites in order to make a determination of location. Consequently, when the portable network device 100 is brought indoors, the positioning receiver 110 may be unable to receive the signals it needs to compute the current location of the portable network device 100.

As shown in FIG. 1, the portable network device may be further equipped with a network adapter 160 such as a LAN card, and memory 120 with address space or registers for holding a device identifier (device ID) 130, coordinates 140 such as latitude and longitude of the last known location of the portable network device 100 as determined by the positioning receiver 110, and the time at which the last known location was determined 150 (throughout, the term "location" refers to physical location). When the positioning receiver 110 is no longer able to determine a location, the coordinates of the last known location of the portable network device 100 are loaded into the register 140, and the time at which the last known location was determined is loaded into the register 150. Thus, for example, when a GPS-equipped laptop computer is brought into a building and consequently loses contact with the requisite GPS satellites, the coordinates of the last known location of the computer and the time at which GPS contact was lost may be recorded.

Figure 2:
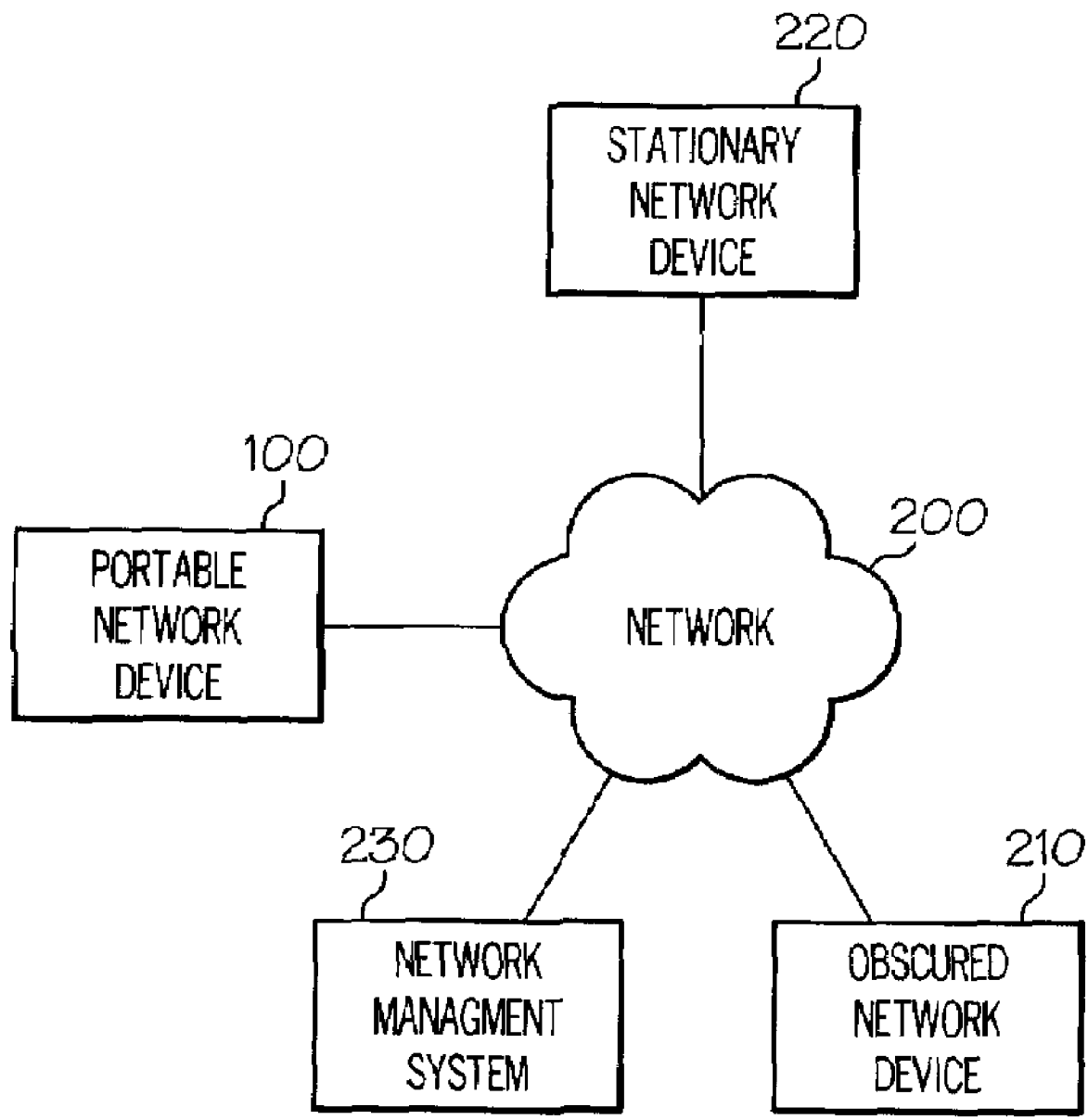
FIG. 2 is a block diagram that shows an exemplary network configuration suitable for application of the invention.

As shown in FIG. 2, the portable network device 100 may attach to a network 200 upon entering the building, through the network adapter 160. The description here uses an illustrative case wherein the network 200 is a local area network. The invention is not so limited, however, and applies as well to all kinds of networks, including, for example, Intranets and the Internet. As shown in FIG. 2, an obscured network device 210 is connected to the network 200. For the purpose of discussion, the obscured network device 210 is an indoor network device whose approximate location is to be determined. The term "obscured" is used with regard to the inaccessibility of the device to GPS signals. The obscured network device 210 may be, for example, a router, a LAN hub, and the like.

As shown in FIG. 2 a stationary network device 220 such as a conventional desktop personal computer, and a network management system 230, may be connected to the network 200. One purpose of the network management system 230 is to provide an operator with a visual or graphical view of the various devices connected to the network 200. Thus the purview of the network management system 230 is greatly simplified here for purposes of discussion. It is not a requirement, of course, that the network management system 230 be connected to the managed devices (the portable network device 100, the obscured network device 210, and the stationary network device 220) by a single-hop LAN as shown in FIG. 2.

Figure 3:
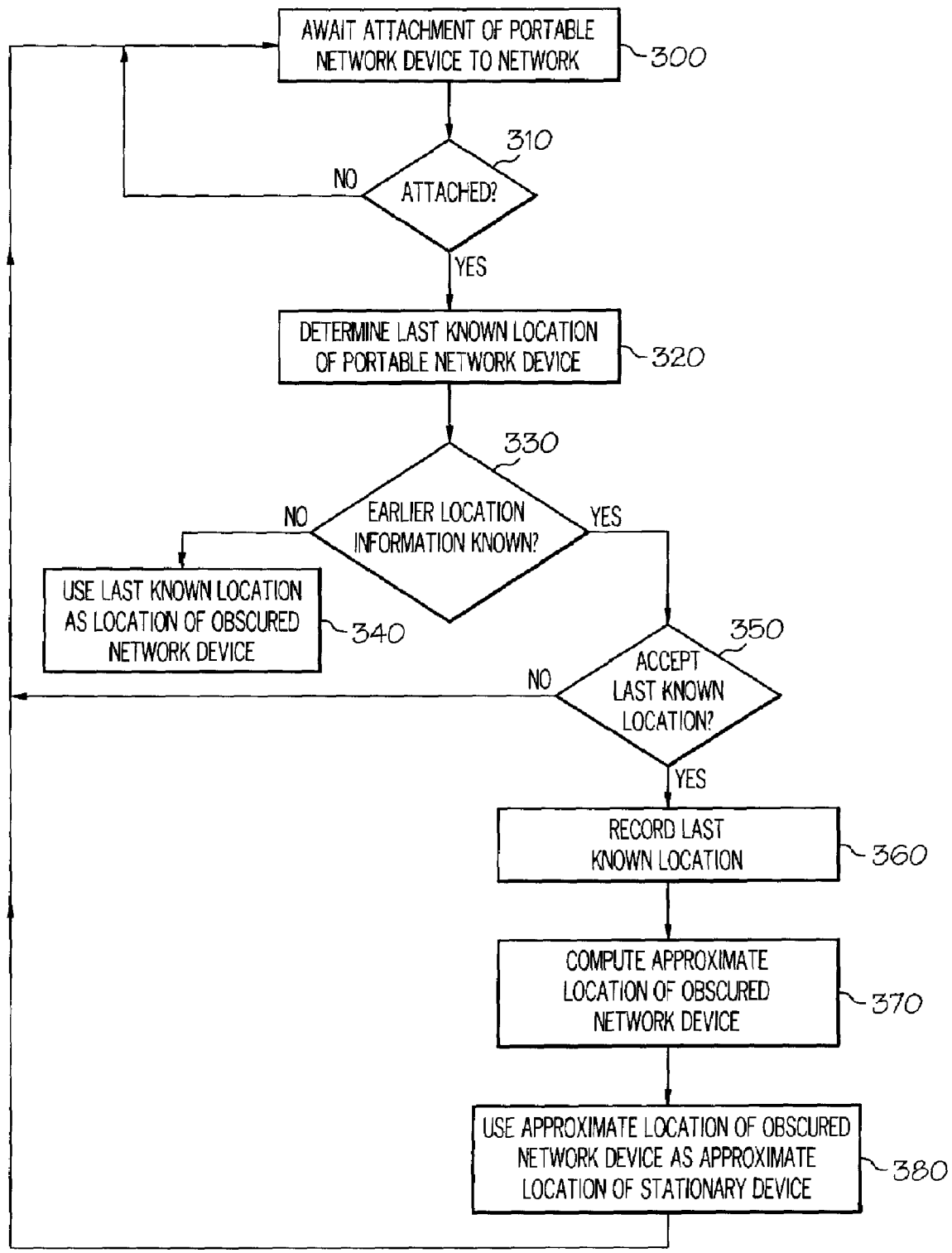
FIG. 3 is a flowchart that shows aspects of a method for determining the approximate locations of network devices according to the invention.

FIG. 3 is a flowchart that shows aspects of a method for determining the approximate location of the obscured network device 210. The method may be executed by, for example, the obscured network device 210 itself, or the network management system 230, or the stationary device 220, or by a network server, or by any other device having suitable logic that is connected to the network 200.

As shown in FIG. 3, the method awaits the attachment of the portable network device 100 to the network 200 (step 300). After attachment (step 310), the coordinates of the last known location of the portable network device 100 are determined from its register 140 (step 320). The last known location may be provided by the portable network device 100 in an unsolicited manner as part of its bid to attach to the network 200, i.e., "pushed," or may be solicited by, for example, the obscured network device 210 or the network management system 230, i.e., "pulled."

A determination is made as to whether any earlier information regarding the location of the obscured network device 210 is known (step 330). If no earlier location information is known, the last known location of the portable network device 100 is used as the approximate location of the obscured network device 210 (step 340).

Otherwise (i.e., earlier information is known about the location of the obscured network device 210), a determination is made as to whether the last known location of the portable network device 100 will be accepted (step 350). One purpose of this determination is to reject statistical outliers. For example, the last known location of the portable network device 100 may be compared with an approximate location of the obscured network device 210 determined by earlier iterations of the inventive method. If the last known location of the portable network device 100 and the earlier determined location of the obscured network device 210 are too far apart, the last known location of the portable network device 100 may be rejected, whereupon the method returns to await the attachment of another portable network device to the network 200 (step 300). In similar fashion, the time of the last known location from the portable network device's register 150 may be compared with the current time, and the last known location of the portable network device 100 rejected if stale.

Otherwise (i.e., the last known location of the portable network device 100 is accepted), the last known location may be recorded (step 360). Optionally, using the Device ID from the portable network device's register 120, an earlier report from the same portable network device 100 may be overwritten. The approximate location of the obscured network device 210 is then computed (step 370), using the newly accepted information. The approximate location may be computed by, for example, averaging the newly accepted last known location together with a plurality of last known locations of a plurality of portable network devices recorded over time in earlier iterations of the inventive method. The approximate location of the obscured network device 210 may then be assigned as the approximate location of stationary network devices that are connected to the same segment of the network 200 (step 380), such as the stationary network device 220 shown in FIG. 2. As shown in FIG. 3, the method returns to await the attachment of another portable network device to the network 200.

Although the foregoing has described systems, methods, and computer program products for determining the approximate locations of network devices that are inaccessible to GPS signals, the description of the invention is illustrative rather than limiting; the invention is limited only by the claims that follow.

What is claimed is:

1. A method for determining approximate location of network devices, comprising:

receiving information about last known locations of portable network devices that attach to a network; and computing an approximate location of an obscured network device connected to the network, which obscured network device is not one of said portable network devices that attach to the network, using the last known locations of the portable network devices;

wherein the act of computing further comprises determining whether to accept a last known location of a portable network device for use in computing the approximate location of the obscured network device;

wherein the act of determining further comprises comparing the last known location of the portable network device with location information computed from a plurality of last known locations of other portable network devices which have attached to the network.

2. The method of claim 1, wherein the last known locations of the portable network devices are determined using information from global positioning satellites.

3. The method of claim 1, further comprising using the approximate location of the obscured network device as an approximate location of a stationary network device connected to the network.

4. The method of claim 1, wherein the act of determining further comprises comparing a current time with a time at which the last known location of the portable network device was determined.

* * * * *